Jan. 29, 1957   E. M. ESTES ET AL   2,779,209
BRAKE CONTROL
Filed Nov. 1, 1952
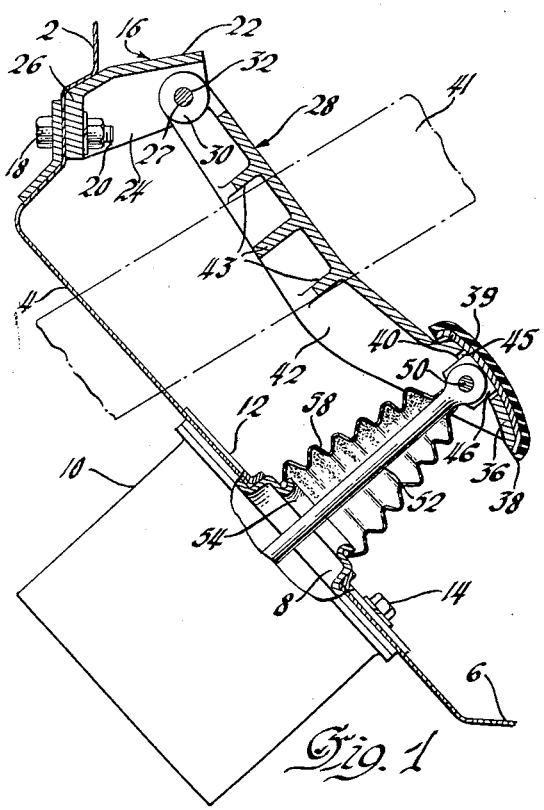
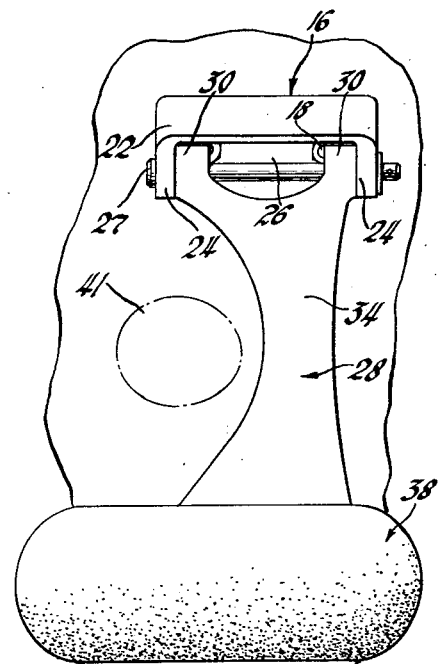
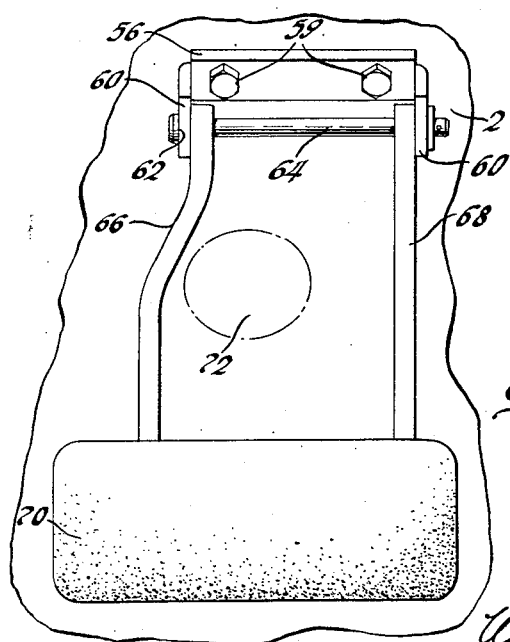
Inventors
Elliott M. Estes &
Carroll K. Lenning
By Willits Helwig & Baillio
Attorneys

United States Patent Office 2,779,209
Patented Jan. 29, 1957

2,779,209

BRAKE CONTROL

Elliott M. Estes, East Lansing, and Carroll K. Lenning, Lansing, Mich., assignors to General Motors Corporation, Detroit, Mich., a corporation of Delaware Application November 1, 1952, Serial No. 318,296

3 Claims. (Cl. 74—512)

This invention relates to brake control mechanisms and more particularly to foot brake pedal structures adapted for use with power operated braking systems.

The invention is herein illustrated as applied to an automotive vehicle having one of the several types of automatic transmissions wherein the clutch pedal is eliminated. In vehicles with automatic transmissions, it has been found desirable and practical to provide a brake pedal of increased width so as to permit the operation thereof by either the right or left foot of the operator. Such an arrangement not only reduces fatigue, but has the additional advantage of increasing the safety factor in vehicle operation.

In vehicles having conventional brake pedals several time consuming steps are involved between the time a hazard is observed and the brakes are actually applied. The operator's foot must be lifted from the accelerator pedal, shifted laterally and applied to the brake pedal. Because of the high rates of speed prevalent currently, drive reaction time plus the time required for such physical movement must be reduced to a minimum. Since little, if anything, can be done to reduce reaction time, the reduction of time required in physical movement is of primary concern. By providing a considerably elongated brake pedal it is possible for the operator to actuate the brake system with the left foot, thereby substantially reducing the time lag involved in operating the brake with the right foot. In practice, it has been found that vehicle operators quickly become accustomed to operating the brake with the left foot and the operation rapidly becomes instinctive.

However, the increased use of brake pedals of extended width aggravates a condition which has been more or less prevalent in a majority of conventional type brake pedals, namely, that the pedal on the lever arm is ordinarily laterally offset with respect to the pivotal plane of the pedal arm hub. With this arrangement it is apparent that foot pressure on the pedal tends to twist the lever arm and cause binding at the hub. In the conventional type brake pedal the results of failure to align the pedal directly with the pivotal plane of the hub is not particularly troublesome since the pedal is usually only slightly offset and usually relatively narrow. While hanger type brake pedals, to some extent, reduce this undesirable twisting or binding, the problem is considerably more serious where wide severely offset brake pedals are used as in vehicles having automatic transmissions, in which case even the hanger type brake pedal is susceptible to twisting and binding when foot pressure is applied to the pedal at the offset extremity thereof.

It is an object of this invention to provide a hanger type brake pedal which is sufficiently wide to permit operation by either foot, and yet is capable of reducing to a minimum twisting and binding when pressure is applied to the outermost offset portion of the pedal.

Another object is to provide a mechanism of the type described which is especially adaptable for use in power assisted braking systems such as the vacuum booster type.

Still another object is to provide an improved foot operated brake pedal mechanism of simple and economical construction which may be readily installed or removed from a vehicle.

These and other objects and advantages of the invention will become more fully apparent from the following description, reference being had to the accompanying drawings wherein:

Fig. 1 is a side elevational view of a portion of an automotive vehicle showing the preferred embodiment of the invention, parts of the mechanism being broken away and in section to more clearly illustrate each of the parts and its location.

Fig. 2 is a fragmentary plan view of the forward floor section and fire wall of an automotive vehicle illustrating the mechanism shown in Fig. 1 and its disposition relative to the steering column of the vehicle, and Fig. 3 is a fragmentary plan view of a modified form of the brake pedal mechanisms shown in Figs. 1 and 2.

Referring now to the drawings and particularly Fig. 1, the fire wall of the vehicle is indicated at 2 and is coextensive with the inclined forward portion 4 of the vehicle floor which extends rearwardly and downwardly at a suitable angle to form the horizontal underbody pan 6 of the vehicle. Inclined portion 4 is formed with an aperture 8 providing access to a vacuum booster cylinder 10 which is mounted on the underside of said inclined portion in alignment with said aperture. A reinforcing flanged ring 12 is mounted on the upper surface of inclined portion 4 and threaded members 14 which extend through said ring and inclined portion threadably engage the housing of the booster cylinder 10 to rigidly secure the latter in position, as shown in Fig. 1.

At the lower edge of the fire wall 2 there is mounted a laterally elongated pedal hanger bracket 16 which is detachably secured to the fire wall 2 by bolts and nuts 18 and 20, respectively, which pass through aligned apertures formed in said fire wall and bracket. Bracket 16 may be press formed from sheet metal and has a generally box-like structure comprising a relatively long top wall 22, spaced apart depending side walls 24 and a back wall 26 having apertures therein through which the attaching bolts 18 are inserted.

In each of the spaced apart depending side walls 24 there are provided axially aligned openings to support a pivot pin 27 which in turn pivotally supports a brake pedal assembly 28. The hub portions 30 of pedal assembly 28 are spaced apart to occupy substantially the entire lateral space between the depending walls 24 of the hanger bracket 16 and are provided with axially aligned openings 32 through which the pivot pin 27 extends. The arm portion 34 of pedal assembly 28 is integral with the spaced apart hubs 30 and extends outwardly and downwardly therefrom and terminates in a laterally elongated portion 36 having a foot pedal 38 mounted on the upper surface thereof. Foot pedal 38 comprises an outer rubber foot engaging portion 39 which is vulcanized to a metal support 40. Since the hanger bracket 16 is mounted on the fire wall 2 substantially in longitudinal alignment with the steering column 41, arm portion 34 is curved inwardly so as to clear said steering column and thereafter progressively increased in area at its opposite end to provide the laterally elongated mounting portion 36 for the pedal 38. As seen particularly in Fig. 1 the underside of the pedal arm 34 is provided with integrally formed flnages 42 and cross webs 43 to add rigidity to the narrow midsection thereof.

Elongated portion 36 has an integral depending projection 45 formed thereon which is longitudinally slotted at the lateral midportion thereof to form a clevis 46. Clevis 46 has transversely aligned openings formed therein for receiving a retaining pin 50 for an operating plunger 52 of booster 10. Plunger rod 52 has a transverse opening provided in the upper inlarged end thereof which when disposed between the arms of clevis 46 aligns with the openings in the latter. Retaining pin 50 when inserted through the openings retains the parts in the position shown in Fig. 1. To prevent the entrance of foreign particles or dirt into the vacuum booster cylinder 10 a generally conical collapsible rubber boot 58 is secured at its lower end the outer periphery of a flange 54 provided at the upper end of booster 10 and at its upper end is secured to rod 52 near the upper end of the latter.

Since the plunger rod 52 is centrally disposed with reference to the lateral extremities of the pedal 38 it will be apparent that the reaction point on the brake pedal is midway between the lateral extremities thereof. It is therefore only when foot pressure is applied at the outermost extremities of the pedal that any tendency to twist will be induced. It will be apparent that the tendency of he pedal arm to twist is resisted by the reinforcing ribs provided on the underside thereof, thus off center application of foot pressure to the pad 36 results in a radial load or wrenching effect on the hub portions 30. By spacing the hub portions 30 apart a distance near or equal to the width of the pedal, virtually all wrenching effect is eliminated since the radial load resulting from pedal application will be centered at some point between the hubs.

In Fig. 3 there is shown a modification of the structure of Fig. 1 wherein a pedal hanger bracket 56 is secured to the fire wall 2 by bolts 59 and is provided with widely spaced apart forwardly bent end portions 60 having transversely aligned apertures formed therein to receive a pivot shaft 64, having a head 62, which in turn pivotally supports a pair of generally parallel arm portions 66 and 68. Arms 66 and 68 are rigidly attached to a pedal plate 70 in any suitable manner, as by bolts or welding. Since the steering column 72 is in longitudinal alignment with a portion of the hanger bracket 56, arm 66 is outwardly offset to provide clearance therefor. It will be apparent that straight parallel arms may be utilized simply by increasing the width of the hanger bracket 56. In its modified form, the invention is not only extremely economical to manufacture but in addition permits the installation of the hanger bracket in a still more central position with reference to either the right or left foot of the operator.

From the foregoing it will be seen that there has been provided brake pedal assemblies of extremely simple construction which are low in cost and easy to install and remove. These devices not only permit the use of a pedal portion of any desired width but have the additional advantage of virtually eliminating any tendency toward twisting or wrenching of the assembly when the brakes are applied, regardless of the point of application of pressure on the pedal.

While the embodiments of the present invention as herein disclosed, constitute two forms of the invention, it is to be understood that other forms might be adopted, all coming within the scope of the claims which follow.

We claim:

1. In a brake control system including power assisting mechanism, a thrust member for actuating said power assisting mechanism, a lever for actuating said thrust member, spaced apart hub portions on one end of said lever, one of said hubs being substantially laterally offset with reference to the longitudinal midplane of said lever, a laterally elongated bracket secured on said vehicle, parallel journal portions on said bracket, said hubs being pivotally secured in said bracket in substantially abutting relation with said journal portions, and a pedal portion on the other end of said lever extending laterally in the same direction as said laterally offset hub.

2. In a vehicle having a steering column, a brake operating mechanism comprising, a bracket disposed in substantial longitudinal alignment with said steering column, a brake lever having widely spaced apart hub portions pivotally secured on said bracket, means on one side of said lever providing clearance for said steering column, a foot pedal secured at the free end of said lever, said pedal being laterally extended toward said steering column to accommodate operation thereof by either the right or left foot, an axially movable plunger, and means centrally disposed on the underside of the free end of said lever for pivotally connecting said plunger and said lever.

3. A vehicle control mechanism adapted for foot control, comprising a laterally elongated box-like support having spaced apart supportive portions, a pivotal member mounted in said supportive portions, a brake operating lever comprising an arm having spaced apart portions mounted on said pivotal member between said supportive portions, said lever having a reduced central portion, reinforcing ribs provided on said lever, a laterally widened pedal supporting portion provided at the free end of said lever, pedal means adapted for either left or right foot operation mounted on said pedal supportive portion, an axially movable operating rod extending through the floor of said vehicle substantially midway between the lateral extremities of said pedal means, and pivotal means operatively connecting the free end of said lever and said operating rod.

References Cited in the file of this patent

UNITED STATES PATENTS

| Re. 21,351 | Neracher | Feb. 13, 1940 |
| 1,429,528 | Payne | Sept. 19, 1922 |
| 1,471,393 | Fox | Oct. 23, 1923 |
| 1,960,823 | Martin | May 29, 1934 |
| 1,973,828 | Swilik | Sept. 18, 1934 |
| 2,242,145 | Rushfeldt | May 13, 1941 |
| 2,483,224 | Narcovich | Sept. 27, 1949 |
| 2,562,700 | Curtenius | July 31, 1951 |
| 2,610,006 | Boyce | Sept. 9, 1952 |
| 2,612,060 | Schetzer | Sept. 30, 1952 |